Oct. 19, 1937.  W. L. MORRISON  2,096,556
VENTILATING APPARATUS FOR VEHICLES
Original Filed Dec. 5, 1932  2 Sheets-Sheet 1
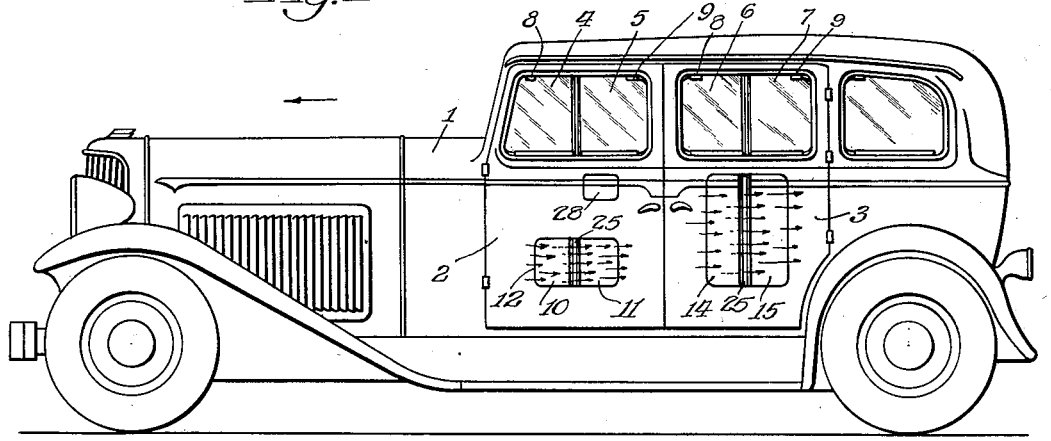
Inventor:
Willard L. Morrison
By Parker & Carr Attys

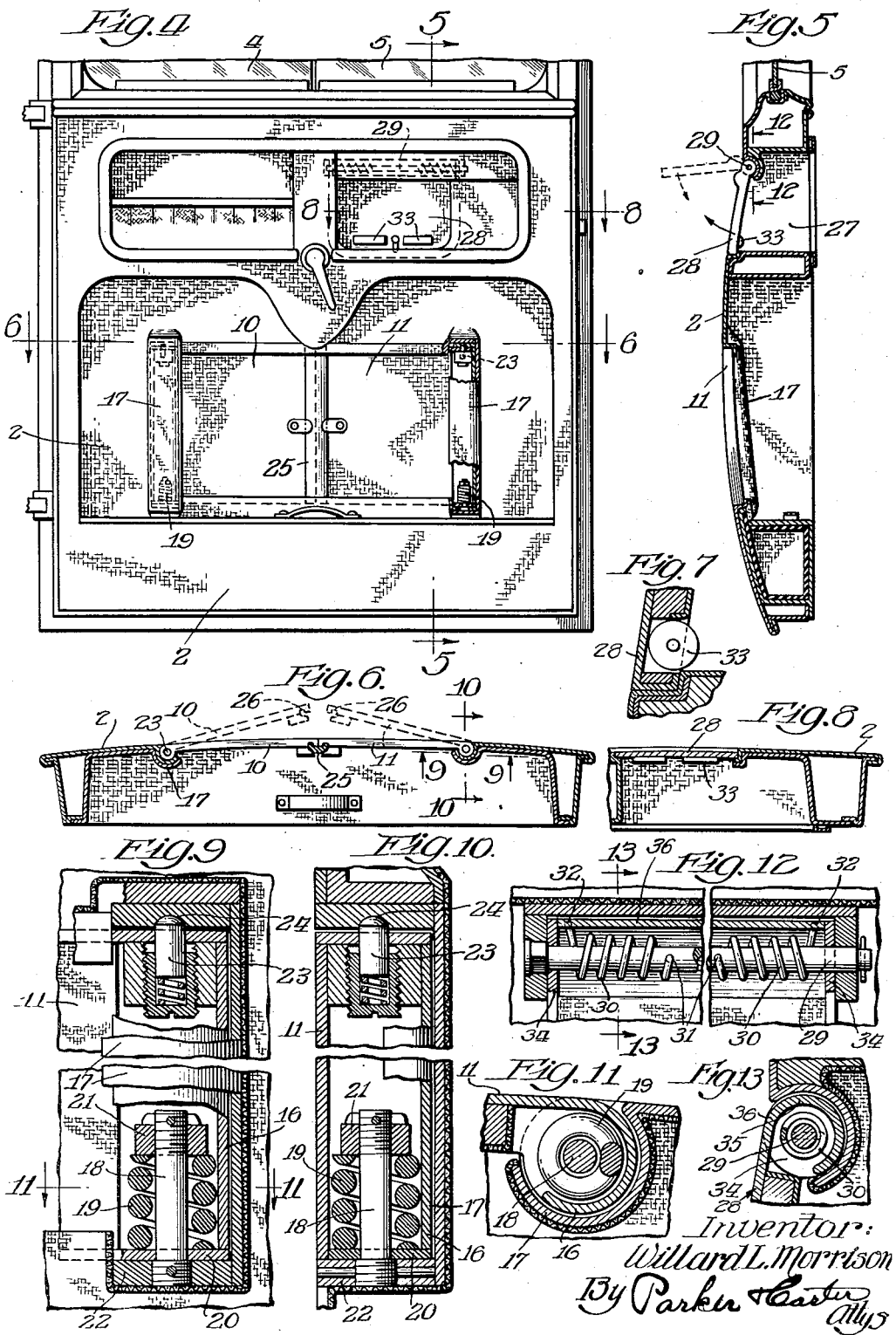

Patented Oct. 19, 1937

2,096,556

UNITED STATES PATENT OFFICE 2,096,556

VENTILATING APPARATUS FOR VEHICLES

Willard L. Morrison, Chicago, Ill.

Application December 5, 1932, Serial No. 645,688
Renewed May 1, 1936

6 Claims. (Cl. 98—2)

This invention relates to ventilating apparatus for vehicles and has for its object to provide a new and improved device of this description. The invention has as a further object to provide a ventilating apparatus by means of which the lower part of the body of the car may be easily and properly ventilated. The invention has as a further object to provide a ventilating apparatus which is brought into action by the movement of the vehicle and which can be adjusted to ventilate the bottom of the car or the entire interior of the car. The invention has other objects which are more particularly pointed out in the accompanying description.

Referring now to the drawings, Fig. 1 is a view of a vehicle showing one form of the ventilating apparatus;

Fig. 2 is a longitudinal sectional view through the vehicle shown in Fig. 1;

Fig. 3 is a sectional view taken on line 3—3 of Fig. 2;

Fig. 3A is a view similar to Fig. 3 showing a modified construction;

Fig. 4 is a view showing the inner face of one of the doors of the vehicle shown in Fig. 1;

Fig. 5 is a sectional view taken on line 5—5 of Fig. 4;

Fig. 6 is a sectional view taken on line 6—6 of Fig. 4;

Fig. 7 is a view showing the lower end of the signaling opening cover;

Fig. 8 is a sectional view taken on line 8—8 of Fig. 4;

Fig. 9 is an enlarged sectional view taken on line 9—9 of Fig. 5, with parts broken away;

Fig. 10 is an enlarged sectional view taken on line 10—10 of Fig. 6, with parts broken away;

Fig. 11 is a sectional view taken on line 11—11 of Fig. 9;

Fig. 12 is an enlarged sectional view taken on line 12—12 of Fig. 5, with parts broken away;

Fig. 13 is a sectional view taken on line 13—13 of Fig. 12.

Like numerals refer to like parts throughout the several figures.

Referring now to the drawings, I have shown a vehicle 1, which is herein illustrated as an automobile. This vehicle may have two or more doors on each side if desired. I have illustrated it as having the two doors 2 and 3. In the window opening of these doors are the window sections 4, 5, 6, and 7. These window sections are separated at their adjacent edges and are pivotally mounted in position, the front sections being pivotally mounted at 8 and the rear sections being pivotally mounted at 9, so that they may be moved to open or close the window. I prefer to have these windows arranged so that it is not necessary to move them up and down, thus leaving the space below them free of any such moving mechanism. There are provided in the door 2 the pivoted sections 10 and 11. The section 10 is pivoted at 12, see Fig. 3, and the section 11 is pivoted at 13, that is the front section is pivoted at the front edge and the rear section pivoted at the rear edge. The door 3 may have similar pivoted sections 14 and 15. These pivoted sections 10, 11, 14 and 15 move about substantially vertical axes. It will thus be seen that these pivoted sections may be moved outwardly to angular positions.

Some means is provided for holding them in any desired angular position. For purposes of illustration I have shown a friction device for this purpose associated with the pivots of the pivoted sections. I have illustrated one form of this friction device in Figures 9, 10 and 11. In this construction the pivoted section 11 has a bent edge 16, see Fig. 11, which is received in a receiving piece 17 in the body. Within this bent edge 16 is a pin 18. A coil spring 19 surrounds the pin and at its lower end bears against the friction plate 20. The pin is screw threaded and is provided with a nut 21 which, when screwed down, compresses the spring and causes a frictional contact between the friction plate 20 and the friction plate 22. This holds the pivoted sections in any desired position in which it may be placed, and the nut may be tightened to get any desired pressure so as to resist the wind pressure as the vehicle is moved forward. The hinged section at the top is provided with the spring pressed pin 23 which is moved up into a recess 24 so as to act as the upper pivotal device. The pivoted sections may have any suitable fastening device for holding them in their closed position. As herein shown the body is provided with the locking device 25 which is received into locking openings 26 in the said edges. I also provide in the door below the window the signaling opening 27 which is normally closed by a door 28 hinged at 29. This door is arranged so that the driver may thrust his arm through it and open it to signal, and it will then automatically close when his arm is removed. The automatic closing is produced by providing the pin 29, which is stationary, with springs 30, one end of which is connected at 31 with the pin and the other end at 32 with a curved part of the door 28 so that as the door is opened the spring is energized and when the arm is removed the spring closes it.

I prefer to provide this signaling opening door with a roller 33 which engages the driver's arm or hand so as to facilitate the opening and closing of the door. In Fig. 3A I have shown a modified construction where there is a pivoted section 34 at the front pivoted at the rear, and the pivoted section 35 back of it pivoted at the front. When these two sections are opened, as shown in Fig. 3A, the air moves in through one of them and out through the other, producing a draft or suction which properly ventilates the car. In Fig. 3A I have shown additional pivoted window sections 34a and 35a. It will be seen that when the pivoted members 10 and 11, for example, are moved to the position shown in Fig. 3, where the rear edge of the section 10 is farther out than the front edge of the section 11, the air rushing by these sections produces a suction which draws air out of the vehicle body, the cooler air coming in to take its place. It will be seen that the front of the body and the rear of the body can be properly ventilated and cooled by means of this apparatus. The window sections may be also moved to ventilating positions so that the upper part of the car may be easily ventilated. The sections on one side may be arranged to scoop air into the vehicle body and the sections on the other side to let it out, so that cross ventilating current may be secured.

I claim:

1. A ventilating apparatus for vehicles comprising two sets of pivoted sections, one above the other, one set of said sections arranged to be moved outwardly to form an opening between them so that the moving air produced by the movement of the vehicle produces a suction to withdraw air from the vehicle through said spaces the other set of sections arranged to scoop air into the vehicle, whereby outside air is passed in the vehicle through one set of sections and inside air is passed out of the vehicle through the other set of pivoted sections.

2. A ventilating apparatus for vehicles comprising two sets of pivoted sections, one above the other, one set of said sections arranged to be moved outwardly to form an opening between them so that the moving air produced by the movement of the vehicle produces a suction to withdraw air from the vehicle through said spaces the other set of sections arranged to scoop air into the vehicle, whereby outside air is passed in the vehicle through one set of sections and inside air is passed out of the vehicle through the other set of pivoted sections, one set of pivoted sections being on one side of the vehicle and the other set on the other side of the vehicle.

3. A ventilating apparatus for closed body automobiles comprising a door forming a part of said closed body, said door having a window at its upper end and being provided with an opening below said window which connects the interior of the closed body with the outside atmosphere, two closure devices for said opening, a forward closure device and a rearward closure device, pivotally mounted in position, said closure devices adapted to be moved about their pivotal connections to a position where portions thereof project beyond the outer wall of said door, the rearward closure device when projecting beyond the wall of the door, acting when the automobile is moved forward, to direct a current of fresh air into said closed body to ventilate said body, means for holding said closure devices in any of their various positions, the forward closure device adapted to be adjusted to various positions to vary the inlet opening between the two devices to adjust the amount of ventilating air passing into the closed body.

4. A ventilating apparatus for closed body automobiles comprising a door forming a part of said closed body, said door having a window at its upper end said door being provided with an opening below said window which connects the interior of the closed body with the outside atmosphere at a point below said window, a closure device for said opening movably mounted in position, its forward edge adapted to be moved out beyond the wall of the door into the air current produced by the forward movement of the automobile, to change the air in the closed body to ventilate the same, said closure device adapted to be adjusted to various positions to vary the speed at which the air in the closed body is changed, and means for holding said closure device in its various adjusted positions.

5. A ventilating apparatus for closed body automobiles comprising a door forming a part of said closed body, said door having a window at its upper end and being provided with an opening below said window which connects the interior of the closed body with the outside atmosphere, a closure device for said opening movably mounted in position, its forward edge adapted to be moved out beyond the wall of the door into the air current produced by the forward movement of the automobile, said closure device adapted to be moved to vary the distance its forward edge projects beyond the wall of the door to vary the amount of air directed into the closed body to ventilate the same, means for holding said closure device in its various adjusted positions, said body portion being provided with a second opening at the rear of the first opening, a closure device therefor movably mounted in position so that its rearward edge is adapted to be moved out beyond the wall of the door, so as to open said rear opening and permit air to pass out of the closed body therethrough, and means for holding said rear closure device in various adjusted positions.

6. A ventilating apparatus for closed body automobiles comprising a door forming a part of said closed body, said door having a window at its upper end, said door being provided with an opening below said window and in the same vertical plane with said window, which connects the interior of the closed body below said window with the outside atmosphere, a closure device for said opening movably mounted about a fixed axis, its forward edge being adapted to be moved out beyond the wall of the door into the air current produced by the forward movement of the automobile to produce a movement of air in the closed body to change the air therein, to ventilate the same, said closure device adapted to be moved about its fixed axis to vary the distance which it projects into the air current, to vary the speed at which the air in the closed body is changed, and means for holding said closure device in its various adjusted positions.

WILLARD L. MORRISON.